US007505460B2

(12) United States Patent
Bell

(10) Patent No.: US 7,505,460 B2
(45) Date of Patent: Mar. 17, 2009

(54) ADDRESS VALIDATING DATA STRUCTURE USED FOR VALIDATING ADDRESSES

(75) Inventor: Carol A. Bell, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 10/832,616

(22) Filed: Apr. 26, 2004

(65) Prior Publication Data

US 2005/0238009 A1   Oct. 27, 2005

(51) Int. Cl.
*H04L 12/28* (2006.01)
*H04L 12/56* (2006.01)
*G06F 9/34* (2006.01)
*G06F 11/00* (2006.01)

(52) U.S. Cl. ........................ 370/389; 370/412; 370/466; 370/395.32; 710/49; 712/5; 711/202; 714/3

(58) Field of Classification Search ........................ None
See application file for complete search history.

(56) References Cited

U.S. PATENT DOCUMENTS 7,254,833 B1 *   8/2007   Cornelius et al. ............. 726/11

OTHER PUBLICATIONS

Gilligan, R., et al. "Transition Mechanisms for IPv6 Hosts and Routers," Network Working Group for The Internet Society, Aug. 2000; 29 pp.

* cited by examiner

*Primary Examiner*—Ronald Abelson
(74) *Attorney, Agent, or Firm*—Konrad Raynes & Victor LLP; David W. Victor

(57) ABSTRACT

Provided is an address validating data structure used for validating addresses. A data structure comprising a plurality of arrays is buffered. Each array includes a plurality of words, wherein one word in each array indicates address words in the array having valid addresses. At least one mask word provides mask information for at least one address word having a valid address, wherein the mask information for one address word indicates bits in the address word. The data structure is used to validate an address received from a transmitting node.

31 Claims, 7 Drawing Sheets

ADDRESS VALIDATING DATA STRUCTURE USED FOR VALIDATING ADDRESSES

BACKGROUND

Systems in a network environment communicate information in packets that encapsulate the information according to network communication protocols. Hosts using the Internet Protocol version 6 (IPv6) to communicate messages over a network can communicate over an Internet Protocol version 4 (IPv4) tunnel through a border router that encapsulates the IPv6 packets from the host within an IPv4 header as described in the publication "Transition Mechanisms for IPv6 Hosts and Routers", Request for Comments ("RFC") 2893 (Copyright 2000, The Internet Society). The border routers that transmit the packets over the IPv4 tunnel implement both the IPv4 and IPv6 protocols. For security reasons, when a router receives a tunneled packet, the router validates the source address in the IPv4 header to determine whether the packet originated from a router having a valid and trusted source address. A single IPv4 interface at a router can have numerous configured tunnels and the source address can be one of many source addresses.

A network processor in routers implementing IPv4 and IPv6 tunneling maintains in memory lists of valid possible source addresses to use to validate the source address included with the IPv6 over IPv4 transmission. Once the source address in the IPv4 header is verified, the receiving router may forward the decapulsated IPv6 packet to the IPv6 network and destination host.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
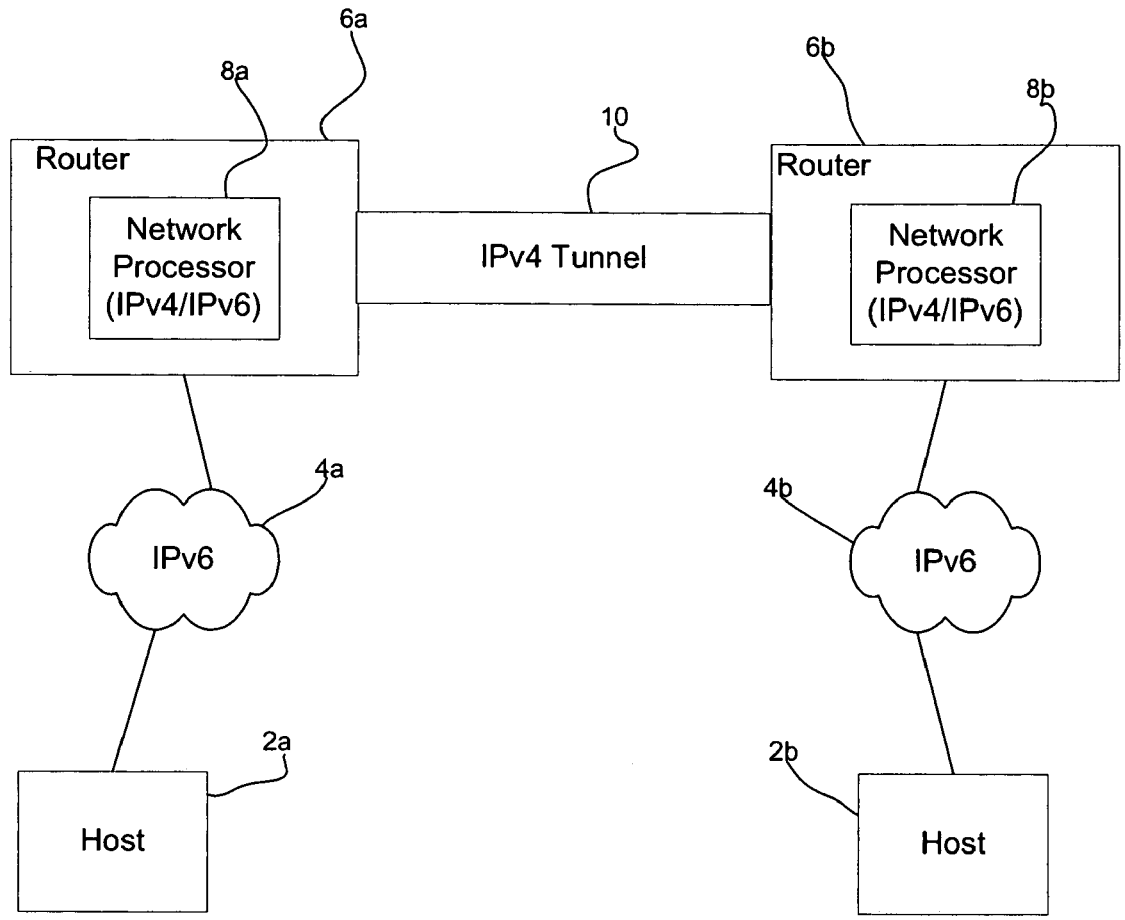
FIG. 1 illustrates a network environment.

FIG. 1 illustrates a network computing environment in which embodiments may be implemented. Host systems 2a and 2b communicate over networks 4a, 4b using the IPv6 protocol. For one host 2a or 2b to communicate with a distant host 2b or 2a, respectively, the sending host 2a, 2b communicates an IPv6 packet to a border router 6a, 6b on the network 4a, 4b. Each router 6a, 6b includes a network processor 8a, 8b implementing both IPv4 and IPv6 protocols. The transmitting router 6a, 6b encapsulates the IPv6 message received from the hosts 2a, 2b in an IPv4 header to transmit through an IPv4 tunnel 10 to the remote/receiving router 6a, 6b. The receiving router 6a, 6b decapsulates the IPv4 message to yield an IPv6 message to transmit to the local host 2a, 2b over the local IPv6 network 4a, 4b.

Figure 2:
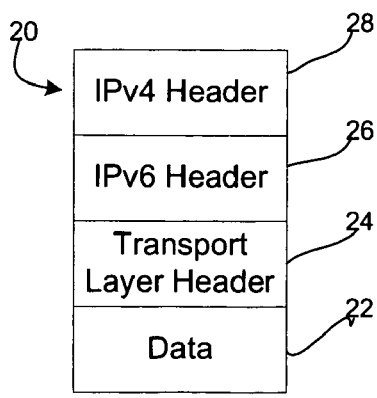
FIG. 2 illustrates a message with headers.

FIG. 2 illustrates a format of an IPv6 packet encapsulated in an IPv4 header. The packet 20 comprises data 22 encapsulated in a transport layer header 24, which is further encapsulated in an IPv6 header 26, which is yet further encapsulated in an IPv4 header 28.

Figure 3:
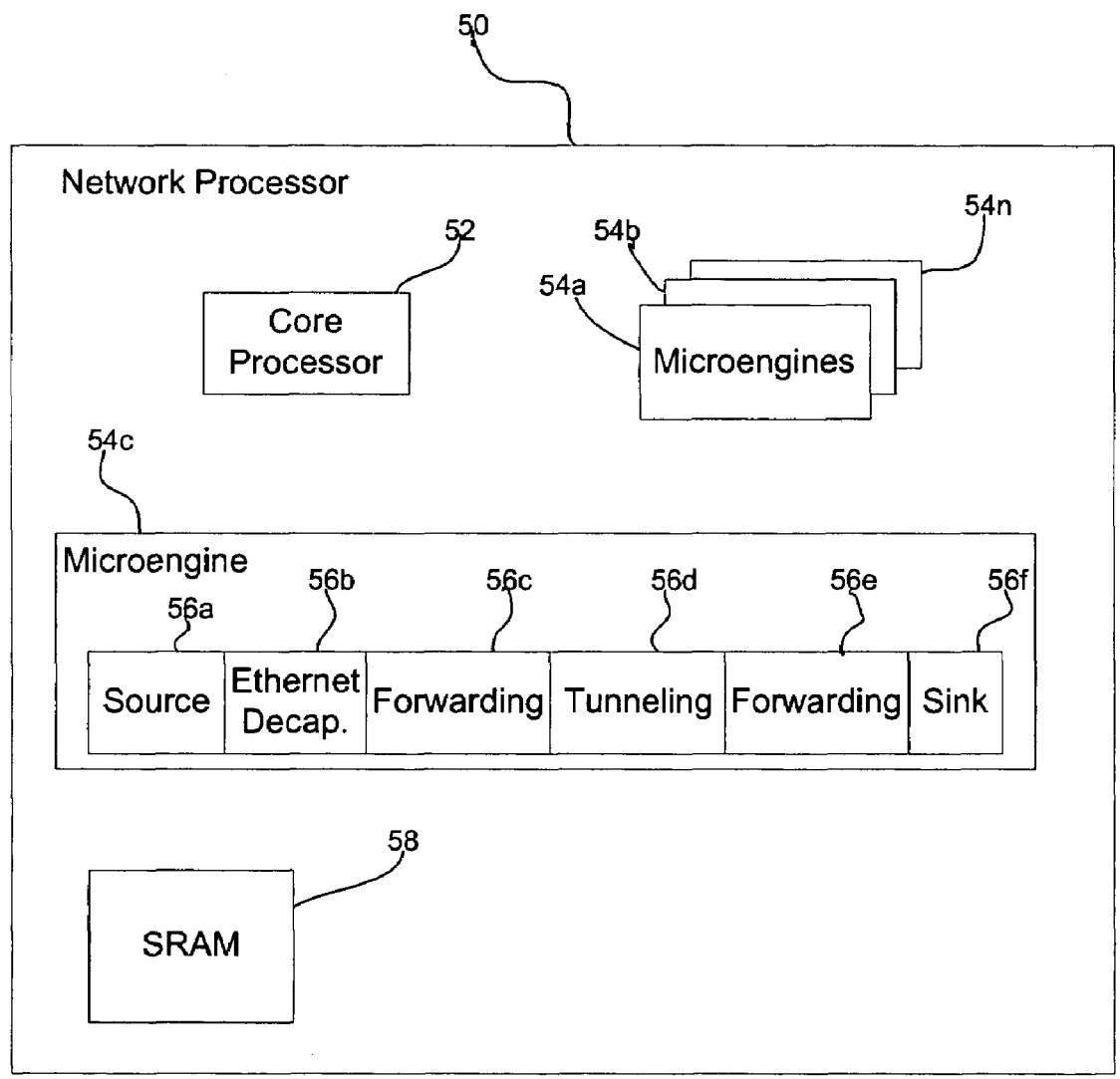
FIG. 3 illustrates components within a network processor.

A network processor, such as network processors 8a, 8b, comprises any device that executes programs to handle packets in a data network, such as processors on router line cards and network access equipment. FIG. 3 illustrates one example of a network processor 50 that may (or may not) include a core processor 52 comprising a general purpose processor running an operating system, and may perform core device operations, including receiving, processing and transmitting packets. The network processor 50 further includes microengines 54a, 54b . . . 54n comprising high speed programmable processors specialized for packet processing. The microengines may each comprise any programmable engine for processing packets. Microengine 54c includes microblocks for processing IPv6 packets encapsulated within an IPv4 header 28 (FIG. 2), where a microblock comprises fast-path packet processing logic executed by the microengines 54a, 54b . . . 54n.

Microengine 54c includes the following microblocks:
Source microblock 56a: receives a packet from outside the microengine 52c and performs preliminary processing. For instance, the source microblock 56a may prepare the packet for processing by the forwarding 56c and tunneling blocks 56d and may cache packet parameters (for example the packet length and the offset into the packet buffer at which the packet begins) that are frequently used by the forwarding and tunneling microblocks. The cache used may be set up in microengine registers for fast access. The source microblock 56a may also set up a cache for the packet IP header, again in registers or in local memory.
Ethernet decpasulater microblock 56b: removes any Ethernet header from the packet and performs validation/checksum operations.
Forwarding microblock 56c: forwards IPv4 packet 20 (FIG. 2) to the tunneling microblock 56d.
Tunneling microblock 56d: validates the source address in the IPv4 header 28 to ensure that the packet originated from a valid router and decapsulates the IPv4 header 28 (FIG. 2) to yield a packet encapsulated in the IPv6 header 26.
Forwarding microblock 56e: forwards the decapsulated packet having the IPv6 header 26 to a sink microblock 56f, which transfers the decapsulated packet outside of the microengine 54c. The forwarding microblock 56e may determine a next hop identifier of where to send the decapsulated packet.

The network processor 50 further includes a Static Random Access Memory (SRAM) 58 to store information used during the processing of received packets, such as valid source addresses to check against the received source address in the IPv4 header 28 to validate that the source address of the device sending the packet is valid and authorized. Further details of a network processor are described with respect to FIGS. 7 and 8.

Figure 4:
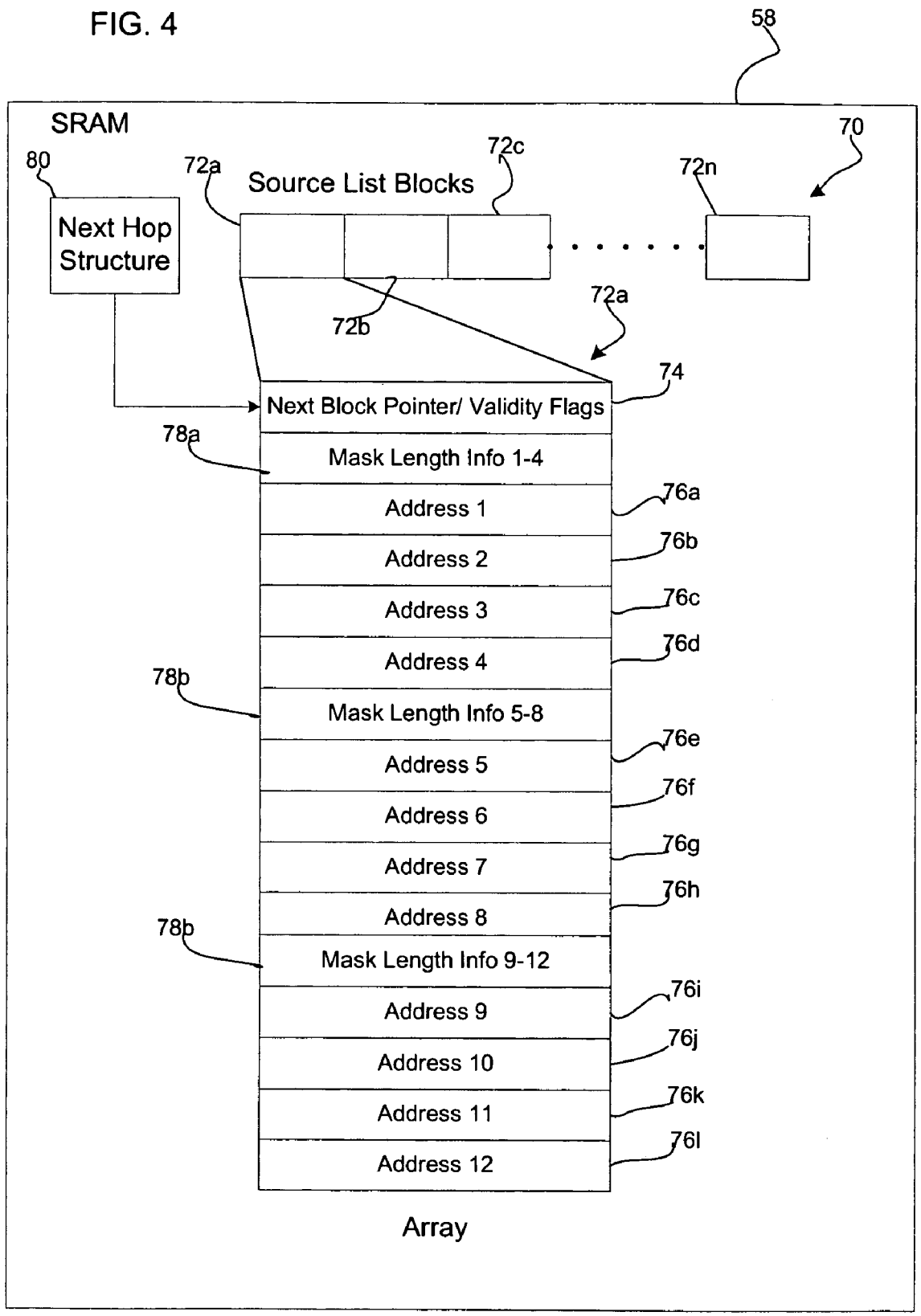
FIG. 4 illustrates a data structure used for validating addresses.

FIG. 4 illustrates a source address validation data structure 70 maintained in the SRAM 58 and used to validate source addresses from the sending router 6a, 6b (FIG. 1). The source address validation data structure 70 comprises a plurality of arrays 72a, 72b . . . 72n, where the details of array 72a are shown. Each array is comprised of a plurality of words, which may comprise 32 or any other number of bits. A first validity/next block word 74 includes bits indicating which address words 76a, 76b . . . 76n include valid addresses and a pointer to a next array, e.g., 72b, 72c . . . 72n, if there is such a next array in the data structure 70. In one example, if there are twelve address words 76a, 76b ... 76l in the array 72a, then the lower 12 bits of the validity/next block word 74 may comprise flags indicating whether each corresponding twelve address words include valid address data and the next 16 bits may be used as a next block index or pointer to a next array. Following the validity/next block word 74 are five groups of 32-bit words, where each group includes a mask word 78a, 78b, and 78c providing mask information for the address words 76a, 76b ... 76l in the group. For example, mask word 78a provides mask values for address words 76a, 76b, 76c, 76d; mask word 78b provides mask values for address words 76e, 76f, 76g, 76h; and mask word 78c provides mask values for address words 76i, 76j, 76k, 76l.

In certain embodiments, the mask values within a mask word 78a, 78b, 78c each comprise five bits indicating the bits in the 32-bit address word having valid address data. A different number of mask bits may be used for a different number of bits in the address word. The mask value may comprise 32 minus the number of valid address bits. So the number of bits in the mask value corresponds to the bits at the end of the word that do not need to be considered to validate the address. For instance, if the address word is "01010100000000000000000000000000" and the mask value is 26, then the bits in the address word used to validate source addresses comprises the first six bits "010101". A next hop structure 80 points to the top of the first array 72a, i.e., the next block/validity word 74, in the source address validation data structure 70. The other arrays 72 ... 72n have a similar structure to array 72a.

In certain embodiments, each array 72a, 72b ... 72n is capable of being read in a single SRAM 58 read transaction. The described embodiments reduce processing overhead by minimizing the number of read operations that are performed to read in the valid source addresses to use during validation. For instance, in one embodiment, each array, e.g., 72a, comprises a 64 byte block that can be read from a single 16 32-bit SRAM register in a single SRAM read transaction.

Figure 5:
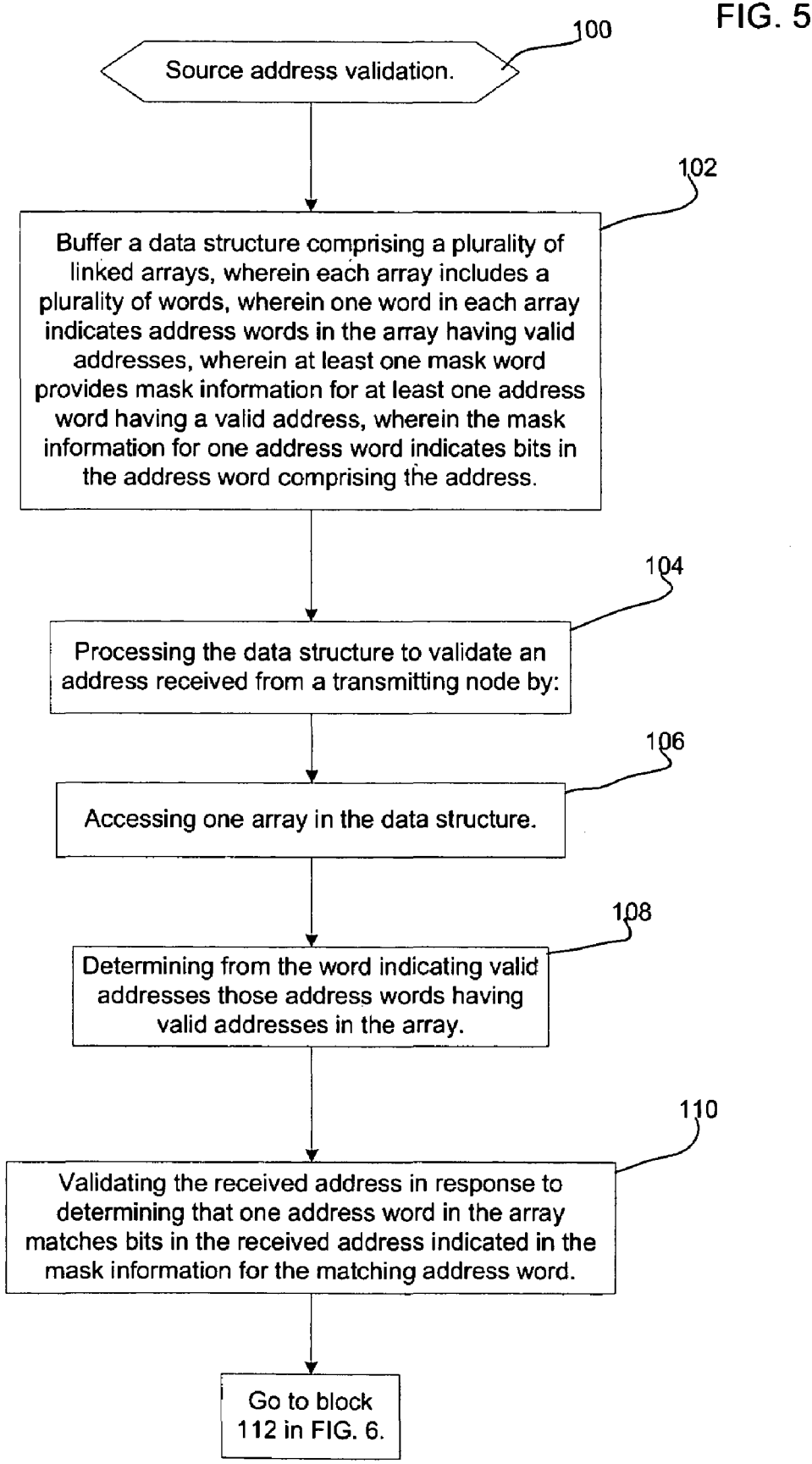
FIGS. 5 and 6 illustrate operations to validate an address received from a transmitting node.
Figure 6:
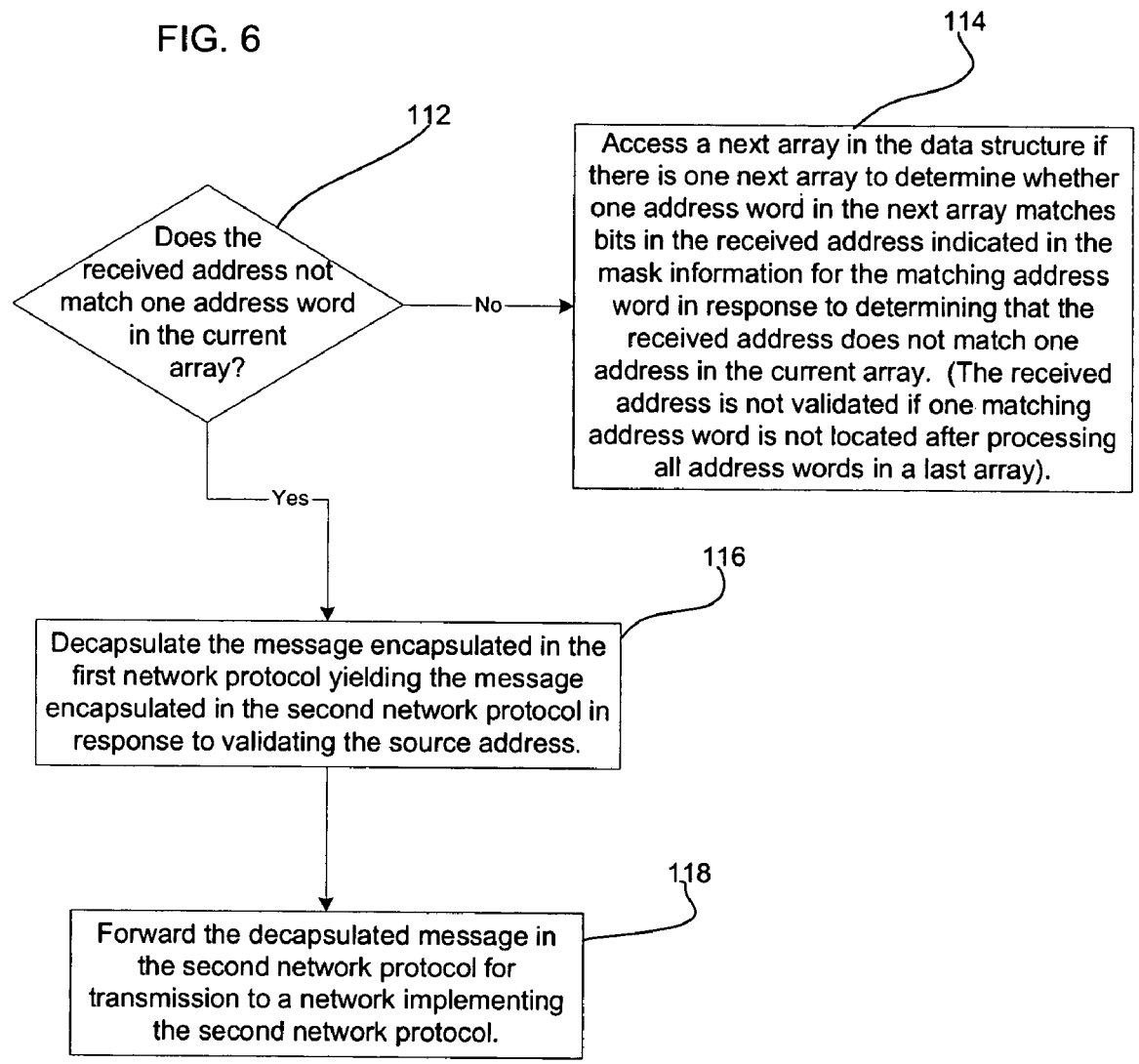

FIGS. 5 and 6 illustrate operations to validate source addresses implemented in a network processor. In the embodiment of FIG. 3, the described operations may be implemented in the tunneling microblock 56d of network processor microengine 54c. With respect to FIG. 5, to perform source address validation (at block 100), a data structure, e.g., data structure 70 in SRAM 58, is buffered (at block 102), where the data structure comprises a plurality of linked arrays, e.g., arrays 72a, 72b ... 72n (FIG. 4). Each array may include a plurality of words, where one word in each array indicates address words in the array having valid addresses, such as the next block/validity word 74. Further, at least one mask word, e.g., mask words 78a, 78b, 78c, provides mask information for at least one address word, e.g., 76a, 76b ... 76l, having a valid address and the mask information for one address word may indicate bits in the address word comprising the address. As discussed, in certain embodiments the data structure may be buffered in SRAM 58, which may be on or off board with respect to the network processor 50.

In certain embodiments, at least one mask word, e.g., 78a, provides mask information for a plurality of address words, e.g., 76a, 76b, 76c, 76d, having valid addresses. Further, one mask word, e.g., 78a, 78b, 78c, may provide mask values for a plurality of address words, wherein the mask value for one address word indicates bits in the word comprising the address. Still further, each array, e.g., 72a, 72b ... 72n, may indicate in one word a next linked array if there is a next linked array in the data structure. The word, e.g., 74, in each array indicating valid word addresses may also indicate the next linked array, e.g., 72b ... 72n, if there is a next linked array.

Yet further, each array, e.g., 72a, 72b ... 72n, in the data structure, e.g., 70, may be read in a single SRAM 58 memory transaction. Reading each array in a single memory transaction conserves read operations, which improves the speed of packet processing in network processing environments where a large volume of packets are being processed at very high speeds.

The data structure is processed (at block 104) to validate an address, such as a source address, received from a transmitting node, such as routers 6a, 6b (FIG. 1). The received address may be validated by performing operations 106 through 118. At block 106, one array, e.g., 72a, 72b ... 72n, in the data structure, e.g., 70, is accessed. When starting the process, the first array may 72a is accessed. A determination is made (at block 108) from the word indicating valid addresses, e.g., the next block/valid word 74, those address words, e.g., 76a ... 76l, having valid addresses. The received address is validated (at block 110) in response to determining that one address word in the array matches bits in the received address indicated in the mask information for the matching address word. The operation of determining that the received source address matches one valid address word 76a, 76b ... 76l may be performed by masking the received source address with the mask value indicated in the mask information for the address word being checked, which is in the mask word 78a, 78b, 78c for the checked address word 76a, 76b ... 76l. This masking operation may be performed by taking a 32 bit word of all ones and shifting left by the mask length and then ANDing with the source address.

With respect to FIG. 6, if (at block 112) the masked received source address does not match one address word in the current array, e.g., 72a, then a next array, e.g., 72b, in the data structure, e.g., 70, is accessed (at block 114), if there is one next array. The next array is accessed to determine whether one address word in the next array matches bits in the received address indicated in the mask information for the matching address word. The next array to process may be determined from the next block pointer in the next block pointer/validity word 74. The received address is not validated if one matching address word is not located after processing all address words in a last array, e.g., 72n, in the data structure 70.

If (at block 112) the currently accessed array does include an address word, e.g., 76a, 76b ... 76l, matching the received address, which may be a source address in an IPv4 header 28 (FIG. 2), then the message encapsulated in the first network protocol is decapsulated (at block 116) to yield a message encapsulated in the second network protocol. The source address is validated if there is a match. The decapsulated message encapsulated in the second network protocol is forwarded (at block 118) to a network implementing the second network protocol.

In certain embodiments, the first network protocol comprises Internet Protocol version 4 (IPv4) and the second network protocol comprises Internet Protocol version 6 (IPv6). In such embodiments, the source packet is received from a transmitting router, e.g., 6a (FIG. 1), by a receiving router, e.g., router 6b. Further, the transmitting and receiving routers may be connected via an IPv4 tunnel, e.g., 10, and communicate IPv6 packets by encapsulating the IPv6 packets within an IPv4 header 28 (FIG. 2).

Figure 7:
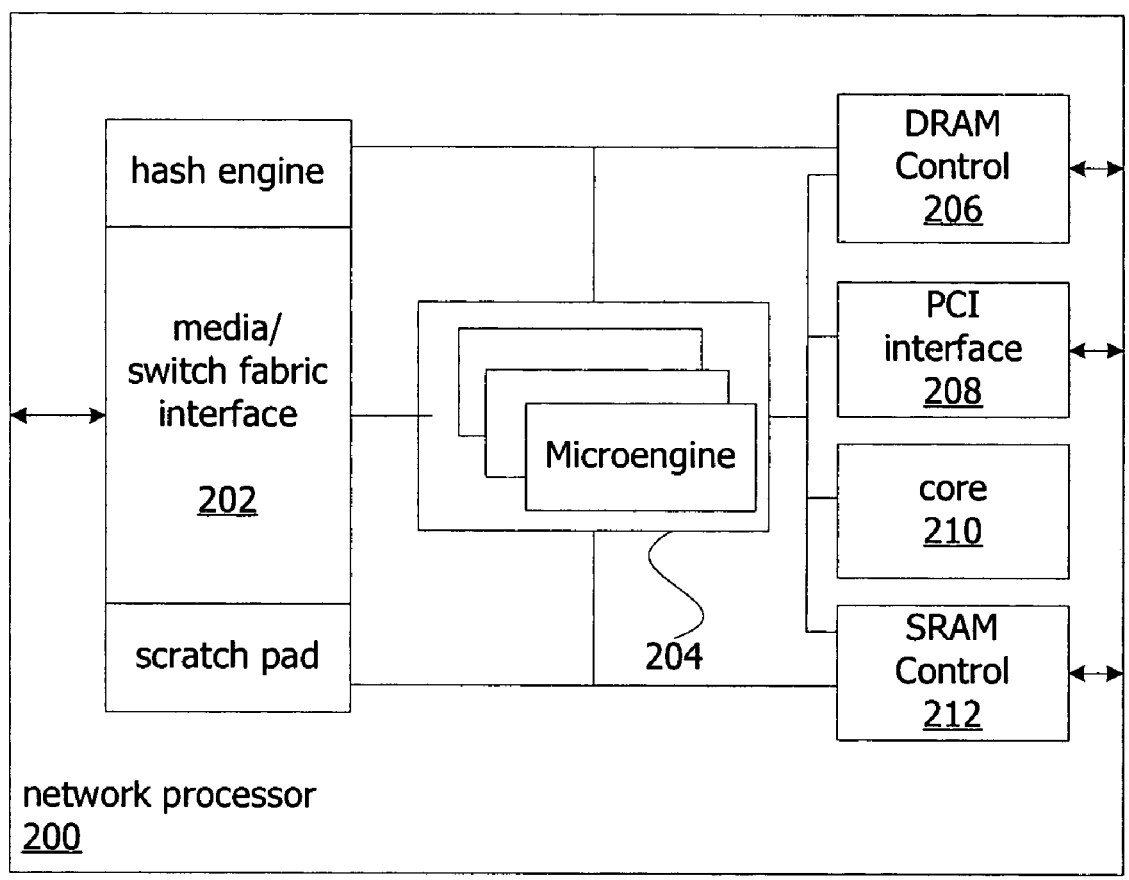
FIG. 7 is a diagram of a network processor.

FIG. 7 illustrates another example of a network processor 200. The network processor 200 shown is an Intel® Internet eXchange network Processor (IXP). Other network processors feature different designs. The network processor 200 shown features a collection of microengines 204, also known as a microengine, programmable engine, etc. The microengines 204 may be Reduced Instruction Set Computing (RISC) processors tailored for packet processing. For example, the microengines 204 may not include floating point instructions or instructions for integer multiplication or division commonly provided by general purpose processors. The network processor 200 components may be implemented on a single integrated circuit die.

An individual microengine 204 may offer multiple threads. For example, the multi-threading capability of the microengines 204 may be supported by hardware that reserves different registers for different threads and can quickly swap thread contexts. In addition to accessing shared memory, a microengine may also feature local memory and a content addressable memory (CAM). The microengines 204 may communicate with neighboring processors 204, for example, using neighbor registers wired to the adjacent engine(s) or via shared memory.

The network processor 200 also includes a core processor 210 (e.g., a StrongARM® XScale®) that is often programmed to perform "control plane" tasks involved in network operations. (StrongARM and XScale are registered trademarks of Intel Corporation). The core processor 210, however, may also handle "data plane" tasks and may provide additional packet processing threads.

As shown, the network processor 200 also features interfaces 202 that can carry packets between the processor 200 and other network components. For example, the processor 200 can feature a switch fabric interface 202 (e.g., a CSIX interface) that enables the processor 200 to transmit a packet to other processor(s) or circuitry connected to the fabric. The processor 200 can also feature an interface 202 (e.g., a System Packet Interface Level 4 (SPI-4) interface) that enables to the processor 200 to communicate with physical layer (PHY) and/or link layer devices. The processor 200 also includes an interface 208 (e.g., a Peripheral Component Interconnect (PCI) bus interface) for communicating, for example, with a host. As shown, the processor 200 also includes other components shared by the engines such as memory controllers 206, 212, a hash engine, and scratch pad memory.

The packet processing techniques described above may be implemented on a network processor, such as the IXP, in a wide variety of ways. For example, one or more threads of a microengine 204 may perform specific packet processing operations, such as validating the packet headers.

In certain embodiments, the microengine 52c implementing the tunneling microblock 56d performing operations described with respect to FIGS. 5 and 6 may be implemented in one of the microengines 204.

Figure 8:
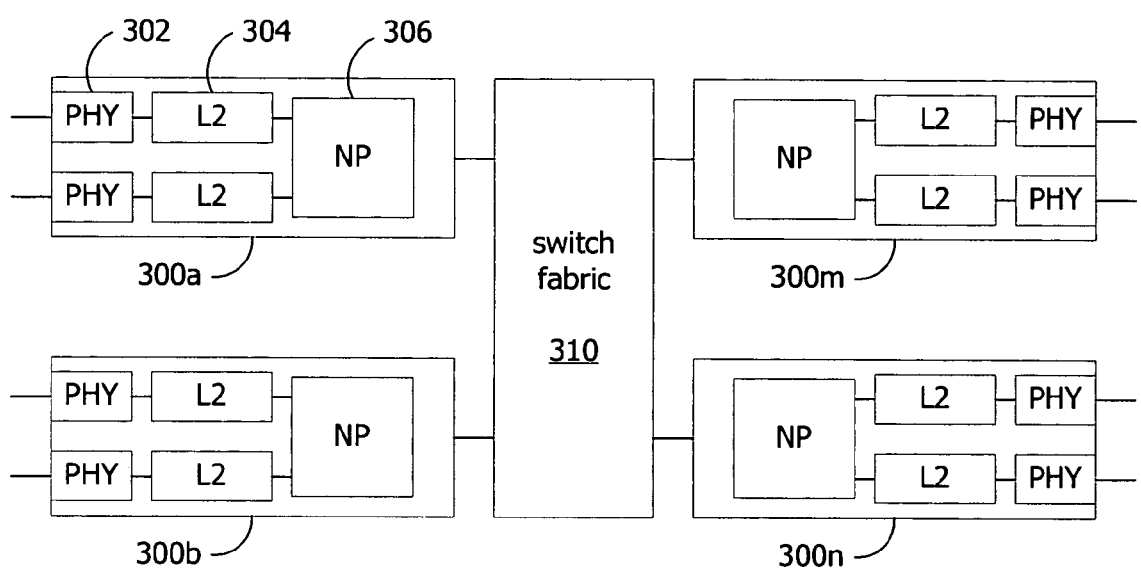
FIG. 8 is a diagram of a network device.

FIG. 8 depicts a network device incorporating techniques described above. As shown, the device features a collection of line cards 300 ("blades") interconnected by a switch fabric 310 (e.g., a crossbar or shared memory switch fabric). The switch fabric, for example, may conform to CSIX or other fabric technologies such as HyperTransport, Infiniband, PCI-X, Packet-Over-Synchronous Optical Network (SONET), RapidIO, and Utopia. CSIX is described in the publication "CSIX-L1: Common Switch Interface Specification-L1", Version 1.0, published August, 2000 by CSIX; HyperTransport is described in the publication "HyperTransport I/O Link Specification", Rev. 1.03, published by the HyperTransport Tech. Consort., October, 2001; InfiniBand is described in the publication "InfiniBand Architecture, Specification Volume 1", Release 1.1, published by the InfiniBand trade association, November 2002; PCI-X is described in the publication PCI-X 2.0 Specification by PCI-SIG; SONET is described in the publication "Synchronous Optical Network (SONET)—Basic Description including Multiplex Structure, Rates and Formats," document no. T1X1.5 by ANSI (January 2001); RapidIO is described in the publication "RapidIO Interconnect Specification", Rev. 1.2, published by RapidIO Trade Ass'n, June 2002; and Utopia is described in the publication "UTOPIA: Specification Level 1, Version 2.01", published by the ATM Forum Tech. Comm., March, 1994.

Individual line cards (e.g., 300a) include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown also include one or more network processors 306 or integrated circuits (e.g., ASICs) that perform packet processing operations for packets received via the PHY(s) 300 and direct the packets, via the switch fabric 310, to a line card providing the selected egress interface. Potentially, the network processor(s) 306 may perform "layer 2" duties instead of the framer devices 304 and the network processor operations described herein.

While FIGS. 7 and 8 described a network processor and a device incorporating network processors, the techniques may be implemented in other hardware, firmware, and/or software. For example, the techniques may be implemented in integrated circuits (e.g., Application Specific Integrated Circuits (ASICs), Gate Arrays, and so forth). Additionally, the techniques may be applied to a wide variety of networking protocols at different levels in a protocol stack and in a wide variety of network devices (e.g., a router, switch, bridge, hub, traffic generator, and so forth).

Described embodiments provide an address validation data structure buffered in memory that includes valid addresses used to validate a source address of a device, such as a router, transmitting the packet. If the address is validated, then the packet may be decapsulated of a network protocol header, such as an IPv4 header, and forwarded to a destination node.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain embodiments, the address validation data structure is used by a process implemented in a microblock executed by a microengine of a network processor to validate a source address in a received packet. In additional embodiments, the address validation data structure of the described embodiments may be used to validate addresses by different types of processors, including central processing units, Input/Output controllers, storage controllers, etc.

The term packet was sometimes used in the above description to refer to an IP packet encapsulating a transport layer. However, a packet may also be a frame, fragment, ATM cell, and so forth, depending on the network technology being used.

Preferably, the threads are implemented in computer programs such as a high level procedural or object oriented programming language. However, the program(s) can be implemented in assembly or machine language if desired. The language may be compiled or interpreted. Additionally, these techniques may be used in a wide variety of networking environments.

The illustrated operations of FIGS. 5 and 6 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   buffering a data structure comprising a plurality of arrays, wherein each array includes a plurality of words, wherein one word in each array indicates address words in the array having valid addresses, wherein each array includes at least one mask word providing mask information for a group of address words including valid addresses, wherein the mask information for the group of address words indicates bits of an address word;
   accessing one of the arrays;
   determining whether bits in an address received from a transmitting node indicated in the mask information for the accessed array match one of the address words in the group of address words included in the accessed array; and
   validating the received address in response to determining that the bits in the address indicated in the mask information match one of the address words.

2. The method of claim 1, wherein at least one mask word provides mask information for a plurality of address words having valid addresses.

3. The method of claim 2, wherein the mask word provides mask values for a plurality of address words, wherein the mask value for one address word indicates bits in the word used to validate the address received from the transmitting node.

4. The method of claim 1, wherein each array is enabled to be read in a single memory read operation.

5. The method of claim 1, wherein each array indicates in one word a next array if there is one next array in the data structure.

6. The method of claim 5, wherein the word in each array indicating valid word addresses also indicates the next array if there is one next array.

7. The method of claim 1, wherein the array comprises a current array, further comprising:
   accessing a next array in the data structure if there is one next array to determine whether one address word in the next array matches bits in the received address indicated in the mask information for the matching address word in response to determining that the received address does not match one address in the current array, and wherein the received address is not validated if one matching address word is not located after processing all address words in a last array.

8. The method of claim 1, wherein the received address comprises a source address in a header for a first network protocol encapsulating a message further encapsulated in a second network protocol, further comprising:
   decapsulating the message encapsulated in the first network protocol yielding the message encapsulated in the second network protocol in response to validating the source address; and
   forwarding the decapsulated message in the second network protocol for transmission to a network implementing the second network protocol.

9. The method of claim 8, wherein the first network protocol comprises Internet Protocol version 4 (IPv4) and the second network protocol comprises Internet Protocol version 6 (IPv6), wherein the source packet is received from a transmitting router by a receiving router, wherein the transmitting and receiving router are connected via an IPv4 tunnel and communicate IPv6 packets by encapsulating the IPv6 packets within an IPv4 header.

10. A network processor in communication with a transmitting node, comprising:
    a buffer; and
    circuitry enabled to:
      store in the buffer a data structure comprising a plurality of arrays, wherein each array includes a plurality of words, wherein one word in each array indicates address words in the array having valid addresses, wherein each array includes at least one mask word providing mask information for a group of address words including a valid addresses, wherein the mask information for the group of address words indicates bits of an address word; and
      accessing one of the arrays;
      determining whether bits in an address received from the transmitting node indicated in the mask information for the accessed array match one of the address words in the group of address words included in the accessed array; and validating the received address in response to determining that the bits in the address indicated in the mask information match one of the address words.

11. The network processor of claim 10, wherein at least one mask word provides mask information for a plurality of address words having valid addresses.

12. The network processor of claim 11, wherein the mask word provides mask values for a plurality of address words, wherein the mask value for one address word indicates bits in the word used to validate the address received from the transmitting node.

13. The network processor of claim 10, wherein each array is enabled to be read in a single memory read operation.

14. The network processor of claim 10, wherein each array indicates in one word a next array if there is one next array in the data structure.

15. The network processor of claim 14, wherein the word in each array indicating valid word addresses also indicates the next array if there is one next array.

16. The network processor of claim 10, wherein the array comprises a current array, wherein the circuitry is further enabled to:

access a next array in the data structure if there is one next array to determine whether one address word in the next array matches bits in the received address indicated in the mask information for the matching address word in response to determining that the received address does not match one address in the current array, and wherein the received address is not validated if one matching address word is not located after processing all address words in a last array.

17. The network processor of claim 10, wherein the network processor is in communication with a network, wherein the received address comprises a source address in a header for a first network protocol encapsulating a message further encapsulated in a second network protocol, wherein the circuitry is further enabled to:

decapsulate the message encapsulated in the first network protocol yielding the message encapsulated in the second network protocol in response to validating the source address; and forward the decapsulated message in the second network protocol for transmission to the network implementing the second network protocol.

18. The network processor of claim 17, wherein the first network protocol comprises Internet Protocol version 4 (IPv4) and the second network protocol comprises Internet Protocol version 6 (IPv6), wherein the source packet is received from a transmitting router by a receiving router, wherein the transmitting and receiving router are connected via an IPv4 tunnel and communicate IPv6 packets by encapsulating the IPv6 packets within an IPv4 header.

19. A network device in communication with a transmitting node, comprising:

a plurality of line cards, wherein at least one of the line cards includes:
a buffer; and
circuitry enabled to:
store in the buffer a data structure comprising a plurality of arrays, wherein each array includes a plurality of words, wherein one word in each array indicates address words in the array having valid addresses, wherein each array includes at least one mask word providing mask information for one address word a group of address words including valid addresses, wherein the mask information for the group of address words indicates bits of an address word;

accessing one of the arrays;

determining whether bits in an address received from the transmitting node indicated in the mask information for the accessed array match one of the address words in the group of address words included in the accessed array; and validating the received address in response to determining that the bits in the address indicated in the mask information match one of the address words; and a switch fabric enabling communication among the line cards.

20. The network processor of claim 19, wherein at least one mask word provides mask information for a plurality of address words having valid addresses.

21. An article of manufacture comprising a computer readable storage medium having computer executable code operated to receive data from a transmitting node and cause operations to be performed, the operations comprising:

buffer a data structure comprising a plurality of arrays, wherein each array includes a plurality of words, wherein one word in each array indicates address words in the array having valid addresses, wherein each array includes at least one mask word providing mask information for a group of address words including valid addresses, wherein the mask information for the group of address words indicates bits of an address word;

accessing one of the arrays;

determining whether bits in an address received from the transmitting node indicated in the mask information for the accessed array match one of the address words in the group of address words included in the accessed array; and validating the received address in response to determining that the bits in the address indicated in the mask information match one of the address words.

22. The article of manufacture of claim 21, wherein at least one mask word provides mask information for a plurality of address words having valid addresses.

23. The article of manufacture of claim 22, wherein the mask word provides mask values for a plurality of address words, wherein the mask value for one address word indicates bits in the word used to validate the address received from the transmitting node.

24. The article of manufacture of claim 21, wherein each array is enabled to be read in a single memory read operation.

25. The article of manufacture of claim 21, wherein each array indicates in one word a next array if there is one next array in the data structure.

26. The article of manufacture of claim 25, wherein the word in each array indicating valid word addresses also indicates the next array if there is one next array.

27. The article of manufacture of claim 21, wherein the array comprises a current array, wherein the article of manufacture is further enabled to:

access a next array in the data structure if there is one next array to determine whether one address word in the next array matches bits in the received address indicated in the mask information for the matching address word in response to determining that the received address does not match one address in the current array, and wherein the received address is not validated if one matching address word is not located after processing all address words in a last array.

28. The article of manufacture of claim 21, wherein the received address comprises a source address in a header for a first network protocol encapsulating a message further encapsulated in a second network protocol, wherein the article of manufacture is further enabled to:
  decapsulate the message encapsulated in the first network protocol yielding the message encapsulated in the second network protocol in response to validating the source address; and
  forward the decapsulated message in the second network protocol for transmission to a network implementing the second network protocol.

29. The article of manufacture of claim 28, wherein the first network protocol comprises Internet Protocol version 4 (IPv4) and the second network protocol comprises Internet Protocol version 6 (IPv6), wherein the source packet is received from a transmitting router by a receiving router, wherein the transmitting and receiving router are connected via an IPv4 tunnel and communicate IPv6 packets by encapsulating the IPv6 packets within an IPv4 header.

30. An article of manufacture comprising a computer readable storage medium having computer executable code operated to receive data from a transmitting node and in communication with a network, and cause operations to be performed, the operations comprising:
  buffer a data structure comprising a plurality of arrays, wherein each array includes a plurality of words, wherein one word in each array indicates address words in the array having valid addresses, wherein each array includes at least one mask word providing mask information for a group of address words including valid addresses, wherein the mask information for the group of address words indicates bits of an address word;
  receive from the transmitting node a source address in a header conforming to a first version of a network protocol encapsulating a message further encapsulated in a second version of the network protocol;
  accessing one of the arrays;
  determining whether bits in the received source address indicated in the mask information for the accessed array match one of the address words in the group of address words included in the accessed array;
  validating the received address in response to determining that the bits in the address indicated in the mask information match one of the address words;
  decapsulating the message encapsulated in the first version of the network protocol yielding the message encapsulated in the second version of the network protocol in response to validating the source address; and
  forward the decapsulated message in the second version of the network protocol for transmission to the network implementing the second version of the network protocol.

31. The article of manufacture of claim 30, wherein the first version of network protocol comprises Internet Protocol version 4 (IPv4) and wherein in the second version the network protocol comprises Internet Protocol version 6 (IPv6).

* * * * *

UNITED STATES PATENT AND TRADEMARK OFFICE
CERTIFICATE OF CORRECTION

| | |
|---|---|
| PATENT NO. | : 7,505,460 B2 |
| APPLICATION NO. | : 10/832616 |
| DATED | : March 17, 2009 |
| INVENTOR(S) | : Bell |

It is certified that error appears in the above-identified patent and that said Letters Patent is hereby corrected as shown below:

In the Claims

Claim 19, Column 9, line 67, through Column 10, line 1, delete "one address word".

Claim 31, Column 12, line 27, "version of network" should read --version of the network--.

Claim 31, Column 12, line 28, "wherin in the second version the" should read --wherein the second version of the--.

Signed and Sealed this
Twenty-ninth Day of July, 2014

Michelle K. Lee
*Deputy Director of the United States Patent and Trademark Office*